(12) United States Patent  
Langan et al.

(10) Patent No.: US 8,771,889 B2  
(45) Date of Patent: Jul. 8, 2014

(54) HYDROGEN GENERATOR

(71) Applicant: Eveready Battery Company, Inc., St. Louis, MO (US)

(72) Inventors: Richard A. Langan, Parma, OH (US); Jason L. Stimits, Avon, OH (US); Chad E. Law, Milan, OH (US); Russell H. Barton, New Westminster (CA); Thomas J. Kmetich, Willoughby Hills, OH (US); Allison M. Fisher, Valley City, OH (US); Guanghong Zheng, Westlake, OH (US); Olen Vanderleeden, Port Moody (CA)

(73) Assignee: Intelligent Energy Inc., San Jose, CA (US)

( * ) Notice: Subject to any disclaimer, the term of this patent is extended or adjusted under 35 U.S.C. 154(b) by 0 days.

(21) Appl. No.: 13/659,938

(22) Filed: Oct. 25, 2012

(65) Prior Publication Data

US 2013/0108940 A1    May 2, 2013

Related U.S. Application Data

(60) Provisional application No. 61/551,487, filed on Oct. 26, 2011, provisional application No. 61/559,329, filed on Nov. 14, 2011.

(51) Int. Cl.  
*H01M 8/06* (2006.01)

(52) U.S. Cl.  
USPC ........................................................ 429/426

(58) Field of Classification Search  
None  
See application file for complete search history.

(56) References Cited

U.S. PATENT DOCUMENTS

| | | | |
|---|---|---|---|
| 3,647,393 A | | 3/1972 | Leising et al. |
| 4,007,777 A | * | 2/1977 | Sun et al. ........................ 165/272 |
| 2003/0180587 A1 | | 9/2003 | Jones et al. |
| 2005/0142404 A1 | | 6/2005 | Boucher et al. |
| 2006/0104035 A1 | * | 5/2006 | Vasoya et al. .................. 361/704 |
| 2009/0117423 A1 | * | 5/2009 | Eickhoff ........................... 429/19 |
| 2010/0226829 A1 | | 9/2010 | Horiguchi et al. |
| 2010/0247425 A1 | | 9/2010 | Scattergood et al. |
| 2011/0033342 A1 | | 2/2011 | Horiguchi et al. |
| 2011/0192732 A1 | | 8/2011 | Lin et al. |

FOREIGN PATENT DOCUMENTS

| | | |
|---|---|---|
| FR | 2957911 A1 | 9/2011 |
| JP | 2006-029396 A | 2/2006 |
| JP | 2007-170604 A | 7/2007 |
| JP | 2009-143793 A | 7/2009 |
| JP | 2009-227512 A | 10/2009 |
| WO | 2004050798 A2 | 6/2004 |

\* cited by examiner

*Primary Examiner* — Patrick Ryan  
*Assistant Examiner* — Jose Colucci Rios  
(74) *Attorney, Agent, or Firm* — Baker & Hostetler LLP.

(57) ABSTRACT

A hydrogen generator and a fuel cell system including a fuel cell battery and the hydrogen generator. The hydrogen generator includes a cartridge, a housing with a cavity to removably contain the cartridge, and an initiation system. The cartridge includes a casing; a plurality of pellets including a hydrogen containing material; a plurality of solid heat transfer members in contact with but not penetrating the casing; a hydrogen outlet in the casing; and a hydrogen flow path from each pellet to the hydrogen outlet. A plurality of heating elements is disposed inside the housing. When the cartridge is in the cavity, each heating element is disposed so heat can be conducted from the heating element and through the casing and corresponding heat transfer member to initiate the release of hydrogen gas. The initiation system can selectively heat one or more pellets to release hydrogen gas as needed.

22 Claims, 10 Drawing Sheets

HYDROGEN GENERATOR

CROSS-REFERENCE TO RELATED APPLICATIONS

This application claims the benefit of U.S. Provisional Application No. 61/551,487, filed Oct. 26, 2011, entitled Hydrogen Generator and of U.S. Provisional Application No. 61/555,329, filed Nov. 14, 2011, entitled Hydrogen Generator with Replaceable Fuel Unit.

TECHNICAL FIELD

This invention relates to a hydrogen generator for providing hydrogen gas and a system, such as a fuel cell system, including the hydrogen generator.

BACKGROUND

Interest in fuel cell batteries as power sources for portable electronic devices has grown. A fuel cell is an electrochemical cell that uses materials from outside the cell as the active materials for the positive and negative electrode. Because a fuel cell does not have to contain all of the active materials used to generate electricity, the fuel cell can be made with a small volume relative to the amount of electrical energy produced compared to other types of batteries.

Fuel cells can be categorized according to the type of electrolyte used, typically one of five types: proton exchange membrane fuel cell (PEMFC), alkaline fuel cell (AFC), phosphoric-acid fuel cell (PAFC), solid oxide fuel cell (SOFC) and molten carbonate fuel cell (MCFC). Each of these types of fuel cell can use hydrogen and oxygen as the active materials of the fuel cell negative electrode (anode) and positive electrode (cathode), respectively. Hydrogen is oxidized at the negative electrode, and oxygen is reduced at the positive electrode. Ions pass through an electrically nonconductive, ion permeable separator and electrons pass through an external circuit to provide an electric current.

In some types of hydrogen fuel cells, hydrogen is formed from a hydrogen-containing fuel supplied to the negative electrode side of the fuel cell. In other types of hydrogen fuel cells, hydrogen gas is supplied to the fuel cell from a source outside the fuel cell.

A fuel cell system can include a fuel cell battery, including one or more fuel cells (such as in a fuel cell stack), and a gas source, such as a gas tank or a gas generator. Gas generators that supply gas to a fuel cell can be an integral part of a fuel cell system, they can be removably coupled to the fuel cell system, or they can include replaceable components containing reactants. A removable gas generator can be replaced with another one when the gas producing reactants have been consumed. Removable gas generators can be disposable (intended for only a one-time use) or refillable (intended for use multiple times) to replace consumed reactant materials.

Hydrogen generators can produce hydrogen using a variety of hydrogen containing materials and a variety of methods for initiating the release of hydrogen therefrom. Hydrogen gas can be evolved when a hydrogen containing material reacts. Examples of hydrogen containing materials include liquid or gaseous hydrocarbons (such as methanol), hydrides (such as metal hydrides and chemical hydrides), alkali metal silicides, metal/silica gels, water, alcohols, dilute acids and organic fuels (such as N-ethylcarbazone and perhydrofluorene). A hydrogen containing compound can react with another reactant to produce hydrogen gas, when the reactants are mixed together, in the presence of a catalyst, heat or an acid, or a combination thereof.

In selecting reactants for use in a hydrogen generator, consideration may be given to the following: (a) stability during long periods of time when the hydrogen generator is not in use, (b) ease of initiation of a hydrogen generating reaction, (c) the amount of energy that must be provided to sustain the hydrogen generating reaction, (d) the maximum operating temperature of the hydrogen generating reaction, and (e) the total volume of hydrogen that can be produced per unit of volume and per unit of mass of the reactant(s).

Some hydrogen containing compounds can be heated to evolve hydrogen in a chemical decomposition reaction. A hydrogen generator using such types of reactants can be advantageous with regard to the volume of hydrogen that can be produced compared to other types of hydrogen generators such as those with a liquid reactant.

An object of the present invention is to provide a hydrogen generator with one or more of the following features: inexpensive and easy to manufacture, safe to store and use, able to produce a large total volume of hydrogen gas per unit of mass and per unit of volume of the hydrogen generator, able to control the supply of hydrogen on an as needed basis, able to operate at or below a desired maximum temperature, at least a portion of the hydrogen generator in a fuel cell system can be replaced after hydrogen containing materials have been consumed, and durable and reliable for a long period of time.

SUMMARY

In one aspect of the invention, there is provided a hydrogen generator, the hydrogen generator including a cartridge, a compartment configured to removably contain the cartridge, and an initiation system. The cartridge includes a casing; a plurality of pellets, each comprising at least one material capable of releasing hydrogen gas when heated; a plurality of solid heat transfer members, each in direct contact with but not penetrating the casing and capable of conducting heat from the casing to the at least one hydrogen containing material; a hydrogen outlet in the casing; and a hydrogen flow path from each fuel pellet to the hydrogen outlet. The compartment includes a housing with a wall; a hydrogen outlet through the housing; a cavity within the housing within which the cartridge can be disposed; and a plurality of heating elements disposed within the housing, such that when the cartridge is disposed within the cavity each heating element is in contact with an outer surface of the cartridge casing and disposed so that heat can be conducted from the heating element, through the casing and to a heat transfer member, which can conduct the heat to a portion of the at least one hydrogen containing material not in contact with the casing. The initiation system includes the heat transfer members, the heating elements, and circuitry for conducting an electric current to the heating elements, such that the electrical current can be applied selectively to one or more heating elements for generating heat to selectively heat one or more pellets to initiate a release of hydrogen gas. Embodiments can include one or more of the following features:

the cartridge has a cylindrical shape;
the cartridge has a prismatic shape;
the cartridge and the compartment cooperate so the cartridge can be inserted into the compartment only such that the heating elements and the heat transfer members are aligned for conducting heat from the heating elements, through the casing to corresponding heat transfer members;

the plurality of pellets is disposed in a plurality of layers; each layer can include a plurality of pellets;

the plurality of pellets is disposed in a single layer;

at least a portion of each heat transfer member is disposed on a pellet surface;

the heat transfer members are partially disposed within the pellets;

each heat transfer member has a cartridge casing contact portion;

each heat transfer member includes aluminum;

each heat transfer member includes a layer of pyrolitic carbon in contact with a pellet;

the heat transfer members are in pressure contact with an inside surface of the casing;

the pellets are disposed in one or more layers and a thermally insulating material with a thermal conductivity of less than 10 watts/(meter·Kelvin) is disposed between adjacent pellets in a layer of pellets; a layer of the thermally insulating material can separate adjacent layers of pellets; pellet surfaces can be coated with a layer of the thermally insulating material;

the portion of the cartridge casing that makes contact with the heating element comprises stainless steel or aluminum;

the housing includes a material with an electrical conductivity at 293° K of less than $10^{-10}$ ohm$^{-1}$·meter$^{-1}$ and a thermal conductivity of less than 10 watts/(meter·Kelvin);

the heating elements are disposed on an inside surface of at least one of the wall and the lid the housing;

the heating elements make pressure contact with the outer surface of the cartridge casing when the cartridge is disposed within the compartment;

the cartridge includes means for maintaining contact between the heat transfer members and the pellets as the hydrogen generator is being used;

the cartridge includes means for maintaining a desired alignment between the heat transfer members and the heating elements as the hydrogen generator is being used;

the hydrogen flow path includes a channel extending through all layers of pellets; the hydrogen flow path can include a central channel; the hydrogen flow path can comprise more than one channel;

at least one filter is disposed in the hydrogen flow path;

the cartridge is enclosed in the casing prior to the cartridge being disposed in the cavity; the cartridge can be sealed in the casing prior to the cartridge being disposed in the cavity; the cartridge can include a foil seal over the hydrogen outlet valve prior to insertion of the cartridge into the compartment; the foil seal can be broken upon insertion of the cartridge into the compartment;

the at least one hydrogen containing material is selected from the group consisting of a material that can absorb and desorb hydrogen and a material that can react to produce hydrogen gas upon thermal decomposition;

the pellets further include an ignition material, preferably at least one material capable of reacting exothermically selected from the group consisting of metal/metal oxide multilayers, a metal/metal multilayered thin film, an autoignition composition, a gel of a metal and water, and a gel of metal and water in combination with sodium borohydride; and the pellets do not contain a catalyst for there lease of hydrogen gas.

In another aspect of the invention, there is provided a fuel cell system including a fuel cell battery and a the hydrogen generator as described above. Embodiments can include one or more of the following features:

a portion of the initiation system is outside the hydrogen generator; and the initiation system is configured to monitor at least one of temperature and pressure and selectively heat one or more pellets to provide hydrogen gas as needed by the fuel cell battery.

Unless otherwise specified, the following definitions and methods are used herein:

a solid heat transfer member is heat transfer member that is not hollow and cannot be used to transport a fluid heating medium therethrough;

a thermally insulating material is a poor conductor of heat;

a poor conductor of heat has a thermal conductivity of less than 10 watts/(meter·Kelvin), preferably less than 1 watt/(meter·Kelvin);

a poor electrical conductor has an electrical conductivity at 293° K of less than $10^{-10}$ ohm$^{-1}$·meter$^{-1}$; and penetrate means to pass through (e.g., between inner and outer surfaces or from one side to another side such as through a seam or joint).

Unless otherwise specified herein, all disclosed characteristics and ranges are as determined at room temperature (20-25° C.).

DETAILED DESCRIPTION

The hydrogen generator produces hydrogen gas. The hydrogen gas can be used by a hydrogen consuming system, such as one including a fuel cell battery that produces electricity for an electronic device. The hydrogen generator includes a compartment into which a replaceable cartridge can be removably inserted. It is generally desirable to include reusable components in the compartment or elsewhere in the system outside the cartridge. In this way the hydrogen generator can be reused at a minimal added expense by replacing the cartridge in which hydrogen containing materials are contained. The cartridge can be disposed of after use, it can be reused by refilling it with fresh materials, or it can be recycled. The size and shape of the cartridge and the compartment can be varied depending on the circumstances. For example, the cartridge can have a generally cylindrical shape, or it can have a generally prismatic shape. More than one cartridge can be contained within the hydrogen generator at one time, either in a single cavity or in more than one cavity.

The cartridge has a casing. The casing can enclose the cartridge or be a sealed casing prior to insertion into the hydrogen generator compartment. One or more hydrogen containing materials are contained in a solid composition that is disposed in a plurality of solid bodies within the casing. The hydrogen containing material in the solid bodies contains elemental hydrogen that is released as hydrogen gas when the material is heated sufficiently. Heat is conducted from heating elements in contact with an outer surface of the cartridge casing, through the casing and a plurality of solid heat transfer members to the hydrogen containing material, thereby causing the material to release hydrogen gas. The hydrogen gas released travels through a hydrogen flow path from each of the solid bodies to a hydrogen outlet valve in the casing.

The solid bodies containing the hydrogen containing material can be in various forms, such as pellets, tablets, wafers, cakes, briquettes, coatings, and so on. Hydrogen containing materials and optional components of the solid composition are described below. The solid bodies can have various shapes, such as circles, ovals, squares, rectangles, trapezoids, wedges, irregular shapes, and so on. The solid bodies can be made using a suitable process, such as molding, extruding, depositing, briquetting, coating, printing, and so on. As used below, the term "pellet" refers to a solid body containing the hydrogen containing material, and is not limited to a particular form, shape or method of manufacture unless otherwise stated. The pellets can be sized and shaped to fit into the housing in a volume-efficient manner. The pellet size and composition can be chosen to provide a desired quantity of hydrogen from each pellet, based on the size of the fuel cell battery and the power requirements of the electronic device, for example.

The hydrogen containing material or materials, which can be referred to as fuel, are contained in a solid composition that can release hydrogen gas when heated. Examples include materials that can reversibly absorb and desorb hydrogen (e.g., metal-organic frameworks (MOFs), zeolites, graphene, carbon nanotubes and metal hydrides as $AB_5$ and $AB_2$ type hydrogen storage alloys such as titanium-manganese, mischmetal-nickel, lanthanum-nickel-cobalt and lanthanum-nickel alloys), materials that can react to produce hydrogen gas upon thermal decomposition (e.g., metal hydrides such as lithium hydride, magnesium hydride, and aluminum hydride (alane), complex hydrides and their ammonia adducts such as lithium borohydride, sodium borohydride, magnesium borohydride, calcium borohydride, ammine titanium (III) borohydride, lithium aluminum hydride, sodium aluminum hydride, lithium amide, and calcium aluminum hydride, and B-N chemical hydrides such ammonia borane and hydrazine borane), and various combinations including the above materials.

The pellets can contain one or more additives. Examples of additives include binders (e.g., acrylates and styrene block copolymers), stabilizing compounds (e.g., solid bases), reaction accelerators (e.g., solid acids), catalysts (e.g., $Fe_2O_3$, $TiCl_3$), ignition materials (described below), thermally conductive materials (e.g., metals, graphites and composites thereof), and so on. Preferably the pellets do not include a catalyst for the hydrogen-generating reaction(s).

The cartridge includes a plurality of heat transfer members (referred to below as heat concentrators) for improving the transfer of heat to the hydrogen containing material, particularly material that is not in contact with the casing. The heat concentrators are solid (e.g., not hollow) and do not penetrate the casing. Each pellet is in contact with a heat concentrator, a portion of which can extend beyond the pellet to make direct contact with the casing. The heat concentrator conducts heat applied by a heating element to an adjacent opposite outer surface of the casing to the solid composition of the pellet. The heat concentrator can be in pressure contact with an inside surface of the cartridge casing (i.e., an inside surface of the casing side wall, bottom or lid). Good contact between the heat concentrator and the casing provides good heat transfer while facilitating manufacture of the cartridge. Preferably the heat concentrator will have a relatively large interfacial contact surface with the casing compared to the thickness of the casing so the majority of the heat from the heating elements will be conducted through the casing to the heat concentrator rather than along the casing wall.

The heat concentrator can be disposed on a surface of the pellet, or it can be partially disposed within the solid composition. For example, a heat concentrator disposed on a surface of the pellet can be in the form of a strip or sheet extending beyond the outer edge or side of the pellet. The protruding edge can be bent along that edge or side, thereby increasing the interfacial surface area with the casing and/or providing a spring-like pressure contact portion. The portion of the heat concentrator that does not extend beyond the edge of the pellet can be flat or have a bent or curved shape. Alternatively, the heat concentrator can be in the form of a cup in which the pellet is disposed, with the peripheral wall of the cup making contact with the casing. One or more heat concentrators can be used to conduct heat to hydrogen containing material in a single pellet, or a single heat concentrator can conduct heat to hydrogen containing material in more than one pellet. In a variation, the heat concentrator can include multiple strips extending beyond the edge of the pellet, with the strips interconnected in an area inward from the edge of the pellet (e.g., with a configuration similar to a leaf rake with tines that are joined together near the handle). This type of configuration can distribute the heat broadly to the pellet with a reduced volume, providing more space for the solid composition of the pellet and consequently more hydrogen containing material in the hydrogen generator. More than one pellet can share the same heat concentrator (e.g., so more than one pellet can be heated at one time). In some embodiments, one heating element may be provide heat to more than one heat concentrator (e.g., if an individual pellet has more than one heat concentrator, or if it is desirable to heat more than one pellet at one time).

Both the heat concentrator and the portion of the casing the heat concentrator contacts are made of materials with good thermal conductivity and capable of withstanding high temperatures. The cartridge casing will also be capable of remaining sealed during use. Suitable materials for the heat concentrator and the portion of the casing include graphite, heat pipes, metals such as aluminum, copper, silver and stainless steel. Alternatively, a molded thermoset material loaded with dust or powder of a thermally conductive material (e.g., metal or graphite). Aluminum is a preferred metal for the heat concentrator because of its high thermal conductivity and relatively low cost. The heat concentrator can be a multi-layer material. For example, it can include a layer of the metal (e.g., aluminum) with a coating of a material with a very high thermal conductivity, such as pyrolitic carbon, between the metal and the pellet solid composition. Aluminum and stainless steel are preferred metals for the cartridge casing. When a very high thermal conductivity is desired, aluminum can be used. If a lower thermal conductivity is desired, stainless steel can be used. Pyrolytic carbon is a man-made carbon material similar to graphite, but with graphene sheets crystallized in a planar order and with some covalent bonding between graphite sheets.

In hydrogen generators where a metal compound in the pellet composition is reduced to a metal with a high thermal conductivity (e.g., the reduction of alane to aluminum metal), it may be possible to reduce the size of the heat concentrator in contact with the pellet if the metal produced will function as a part of the heat concentrator. This can make more space available for hydrogen containing materials and maintain good heat transfer to those materials during use of the hydrogen generator.

The heat concentrator can conduct heat directly to the hydrogen containing material, or an ignition material (a material that will react exothermically, producing heat necessary for the release of hydrogen gas from the hydrogen containing material) can be included in the pellet, such as in a mixture with the hydrogen containing material or as a separate layer or portion of the pellet. If the release of hydrogen gas from the hydrogen containing material generates heat, it may be possible to reduce or stop applying heat after the release is initiated. An ignition material will react exothermically and can be used to supplement or replace the application of more heat by the heating elements, thereby reducing the amount of energy consumed by the hydrogen generator. The ignition material can be admixed with the hydrogen containing material or be a separate coating, layer or portion of the pellet. Preferably the ignition material will also produce some hydrogen gas when it reacts, adding to the total amount of hydrogen that is released. Examples of ignition materials (some of which can also contribute to the hydrogen yield) include metal/metal oxide multilayers such as $Ti/Pb_3O_4$, $Zr/Fe_2O_3$, guanidinium borohydride, B-N compounds blended with oxidizers such as ammonium nitrate or $Sr(NO_3)_2$ as described in US2011/0027168A1, metal/metal multilayered thin films and structures such as Ni/Al as described in U.S. Pat. No. 7,867,441, autoignition compositions such as silver nitrate mixed with potassium nitrate and molybdenum metal as described in U.S. Pat. No. 6,749,702, complex hydride, oxidizer, and S compositions such as described in U.S. Pat. No. 7,964,111, and the compositions described in patents US2008/0236032A1 and US 2008/0241613A1. Other compositions include gels of metals and water such as Mg/water/poly(acrylamide-co-acrylic acid) alone or in combination with sodium borohydride (Varma, et al. *Chem. Eng. Sci* 2010, 65, 80-87 and *Int. J. Hydrogen En* 2007, 32, 207-211, respectively).

The pellets can be arranged within the cartridge in a variety of ways. For example, the plurality of pellets can be arranged in a single layer or in a plurality of layers with each layer containing one or more than one pellet. Factors such as the size and shape of the cartridge, compartment and hydrogen generator, the volume of hydrogen to be released by a single cartridge, and simplicity of the initiation system can be considered in selecting a pellet arrangement. For example, if the layers are relatively large it may be desirable to include a plurality of pellets on each layer in order to enable hydrogen release at a slower rate, while if the layers are relatively large it may be desirable to have fewer pellets or only a single pellet on each layer to minimize the amount of thermal insulation required between adjacent pellets.

While it may be desirable to react more than one pellet at a time, in order to prevent the uncontrolled initiation of reactions in adjacent pellets it is desirable for individual pellets or groups of pellets to be thermally insulated from one another. This can be accomplished in various ways, including spacing pellets apart from each other, separating pellet layers with themally insulating material (e.g, sheets or layers of thermally insulating material), placing thermal insulation between adjacent pellets or layers of pellets (e.g., containers or coatings made of thermally insulating material), and so on. Suitable thermal insulator materials include silica, silicon dioxide, silicon nitrides, silicon carbide, silica aerogel, alumina, alumina oxide, glass, glass wool, mineral wool, cellular glass, perlite, and polymers such as polyimides and epoxyamine composites. Other types of heating elements may be used.

The heating elements are disposed within the compartment, such as on an inside surface of the compartment housing. This surface, which can be a surface of a wall or a portion of the housing that can be opened or removed to allow insertion and removal of a cartridge, can define a portion of a cavity into which the cartridge can be inserted. When the cartridge is installed in the compartment, the cartridge and compartment are positioned such that each heating element is in contact with an outer surface of the cartridge casing and aligned with a heat concentrator in contact with the casing. The heating elements and adjacent heat concentrators can be directly opposite each other, separated by the casing. There can be a path with high electrical resistance and high thermal conductivity between the heating elements and the cartridge casing (e.g., a coating on resistive heating elements) to allow heat transfer as well as prevent shorting of the heating elements. Each heat concentrator can be supplied with heat from a single heating element, one heating element can be used to supply heat to more than one heat concentrator, or multiple heating elements can supply to heat to a single heat concentrator. Because the cartridge is removable from the hydrogen generator, insertion and removal of the cartridge can be facilitated if contact between the heating elements and the cartridge casing is a pressure contact, rather than a welded or other fastened contact for example. Examples of suitable types of heating elements include resistive heating elements. Resistive heating elements can be wire, ribbon or strip. Suitable materials include metals and alloys (e.g., nickel-chromium alloys, iron-chromium-aluminum alloys, copper-nickel alloys, and other types of alloys), intermetallic compounds (e.g., molybdenum disilicides) and metal-ceramics.

It may be desirable to include means for maintaining good contact between the solid composition and the heat concentrators in pellets while the hydrogen generator is being used, particularly if the density of the solid composition changes as materials react. It may be desirable to include means for maintaining alignment between the heat concentrators and their corresponding heating elements in unused pellets and as pellets are reacted. Biasing elements, such as compression pads and springs, may be useful for these purposes. It may be desirable to design heat concentrators to also function as biasing members. It may be desirable to control the sequence of heating individual pellets to minimize the effects of heated pellets on the unused pellets in the cartridge.

The compartment housing is made of a material that can withstand the temperatures and pressures to which it may be exposed. It can be a poor conductor of heat in order to protect other components of the system as well as the user from damaging or dangerous temperatures. It can be a poor electrical conductor to prevent short circuiting of the heating elements and the electrical circuit including them. If it is not a material with poor thermal or electrical conductivity, thermal and/or electrical insulation can be added. Examples of suitable materials include metals such as aluminum, steel, stainless steel and so on, or high temperature resistant ceramics and polymeric materials. Examples of high temperature polymeric materials include polyoxybenzylmethylenglycolanhydride (Bakelite®), polyetheretherketone, polyetherimide, and thermoset injection molded plastics such as epoxies, phenolics, diallyl phthalate and melamine.

When the cartridge is inserted into the compartment it must be positioned so the heating elements are properly aligned with the heat concentrators. This can be accomplished by a cooperation between the cartridge and the compartment. For example, the cartridge and the compartment can be keyed (e.g., portions of the cartridge and compartment mate with each other, as a key mates with a lock, only when the cartridge and the compartment are positioned relative to one another such that the heating elements and heat concentrators are properly aligned).

If the heating elements on the inner surface of the compartment housing are in pressure contact with the outer surface of the cartridge casing, the heating elements can include spring-like elements that will allow easy insertion and removal of the cartridge into the compartment. Alternatively, the compartment housing can be oversized relative to the cartridge casing and reduced in size after cartridge insertion and increased in size for cartridge removal. This can be accomplished in a variety of ways. For example, the housing can have long segments separated by spaces, similar to a collet chuck, that form a collar around the inserted cartridge; a slip ring or other device can be used to tighten and loosen the segments. In another example, the housing can be split along its length and be tighted with a clamping device similar to a piston ring compressor or a radiator hose clamp. Alternatively, the housing can be a split spring-like device similar to a tolerance ring that is enlarged as the cartridge is inserted and biases the housing against the inserted cartridge casing.

An initiation system including the heat concentrators, the heating elements and circuitry for conducting electric current to the heating elements, selectively heats one or more pellets at a time to generate a desired quantity of hydrogen gas. This can be done by applying current to the desired heating element(s) such that the heating element becomes hot and heat is transferred from the heating element, through the casing, to the aligned heat concentrator, and then to the pellet solid composition. The current source can be a battery, fuel cell or other source of electrical energy within hydrogen generator, elsewhere in the system, or even outside the system (e.g., within a device being supplied with power from a fuel cell battery in the system).

The initiation system can include one or more monitors for monitoring one or more hydrogen generator, fuel cell battery, fuel cell system or device parameters. These parameters can be useful in controlling the hydrogen generator to insure safety and to generate hydrogen on an as needed basis. The initiation system can include or be included in a control system. The control system can be used to control the release of hydrogen, such as to provide hydrogen gas as needed. This can be determined based on one or more criteria, such as pressure (e.g., internal pressure or a differential between an internal and an external pressure); temperature (e.g., hydrogen generator, fuel cell or device temperature); a fuel cell electrical condition (e.g., voltage, current or power); or a device criterion (e.g., internal battery condition, power input, or operating mode. The control system can be used for other purposes. For example, it can be used to monitor the quantity of fuel remaining in the cartridge and provide related information to the user. It can be used to halt the release of hydrogen gas to avoid unsafe conditions. It can be used to monitor or verify information regarding the installed cartridge (e.g., to confirm that it is the correct type of cartridge, has sufficient fuel remaining, and so on). It can provide one- or two-way communication among components of the fuel cell system and/or a device including the fuel cell system. The control system can be completely or partially disposed in the hydrogen generator, a fuel cell battery, a fuel cell system, a device being powered by the fuel cell system, or any combination thereof. The control system can include a microprocessor or micro controller; digital, analog and/or hybrid circuitry; solid state and/or electromechanical switching devices; capacitors; sensing instrumentation; and so on.

The hydrogen flow path can include a channel extending through or around the pellets or pellet layers. The channel can be a central channel for example. Multiple channels can be present. The hydrogen generator can include one or more filters and/or purification units to remove undesired reaction byproducts and other contaminants from the hydrogen gas. The filter(s) and purification unit(s) can be disposed in the hydrogen flow path.

The hydrogen generator can also include various fittings, valves and electrical connections for providing hydrogen to and interfacing with a fuel cell battery and/or an electrical appliance being provided with power by the fuel cell system. For example, the hydrogen outlet valve in the cartridge casing can cooperate with the hydrogen outlet through the compartment housing so hydrogen gas can be released. The hydrogen outlet through the housing can be an opening through which the hydrogen outlet valve can extend, or the a connector from another component of the system can extend through the opening to couple with the hydrogen outlet valve. Alternatively, the hydrogen outlet can include a connector that couples with the hydrogen outlet valve.

The hydrogen generator can include various safety features such as a pressure relief vent to release excessive pressure and a mechanism to stop the initiation system if the internal temperature or pressure exceeds an established limit.

To help maintain a tight seal before use and to indicate an unused cartridge, a seal, such as a foil seal, can be placed over the hydrogen outlet valve. The foil seal can be removed before inserting the cartridge into the compartment, the seal can be broken by inserting the cartridge into the compartment, or internal pressure from the hydrogen gas released when the cartridge is used can force the seal open. Alternatively, the cartridge can be packaged in a hermetically sealed container and removed before use.

In embodiments of a hydrogen generator in which more than one cartridge can be contained, the hydrogen generator can be designed to operate with less than the maximum number of cartridges inserted. The individual cartridges can be accessible through a single access (e.g., lid, door or the like) or multiple accesses. It can be advantageous for cartridges to be separately replaceable while the hydrogen generator is operating in order to provide for continuous operation, without shutting down to replace spent cartridges.

Figure 1:
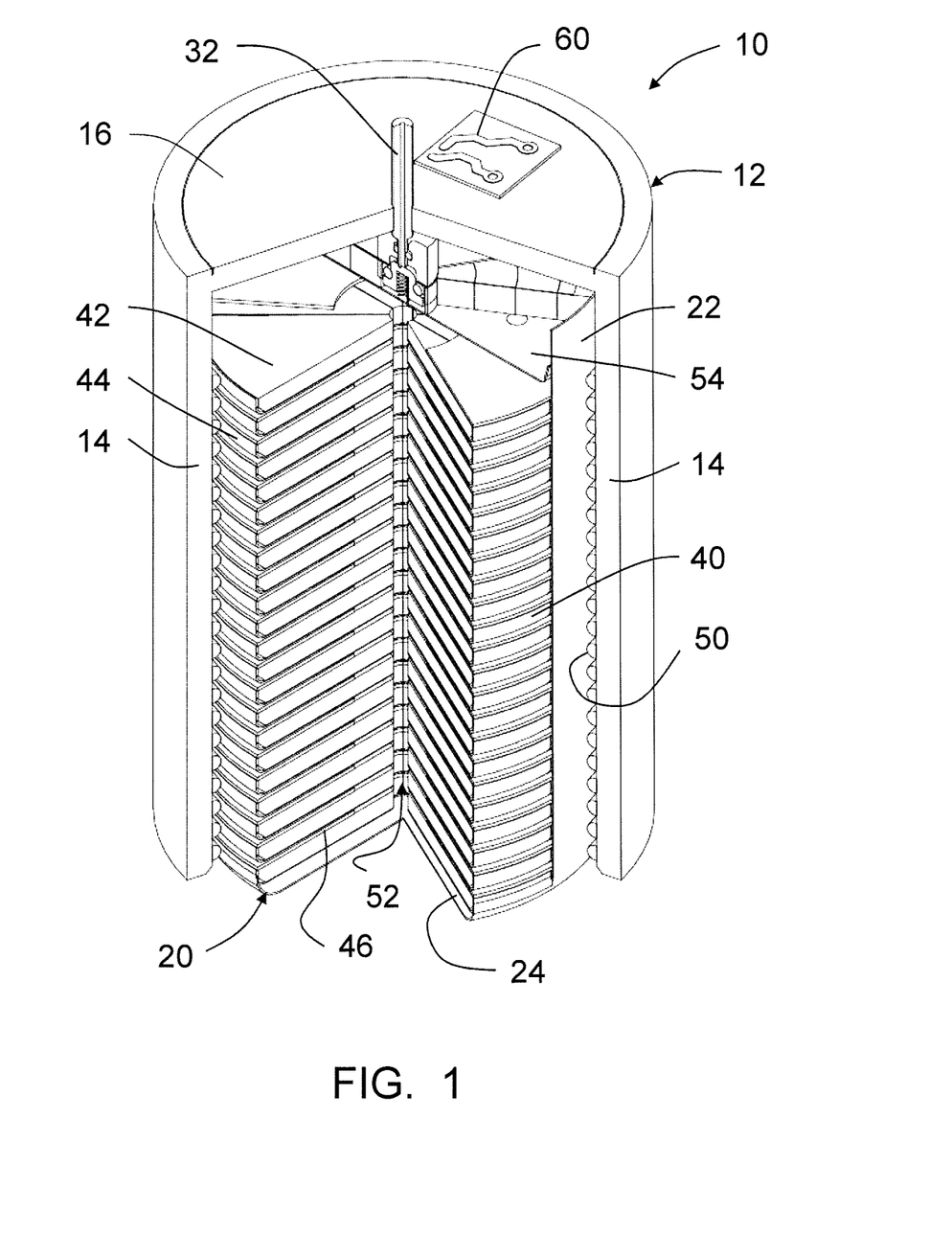
FIG. 1 is a partial sectional perspective view of a hydrogen generator according to a first embodiment.
Figure 2:
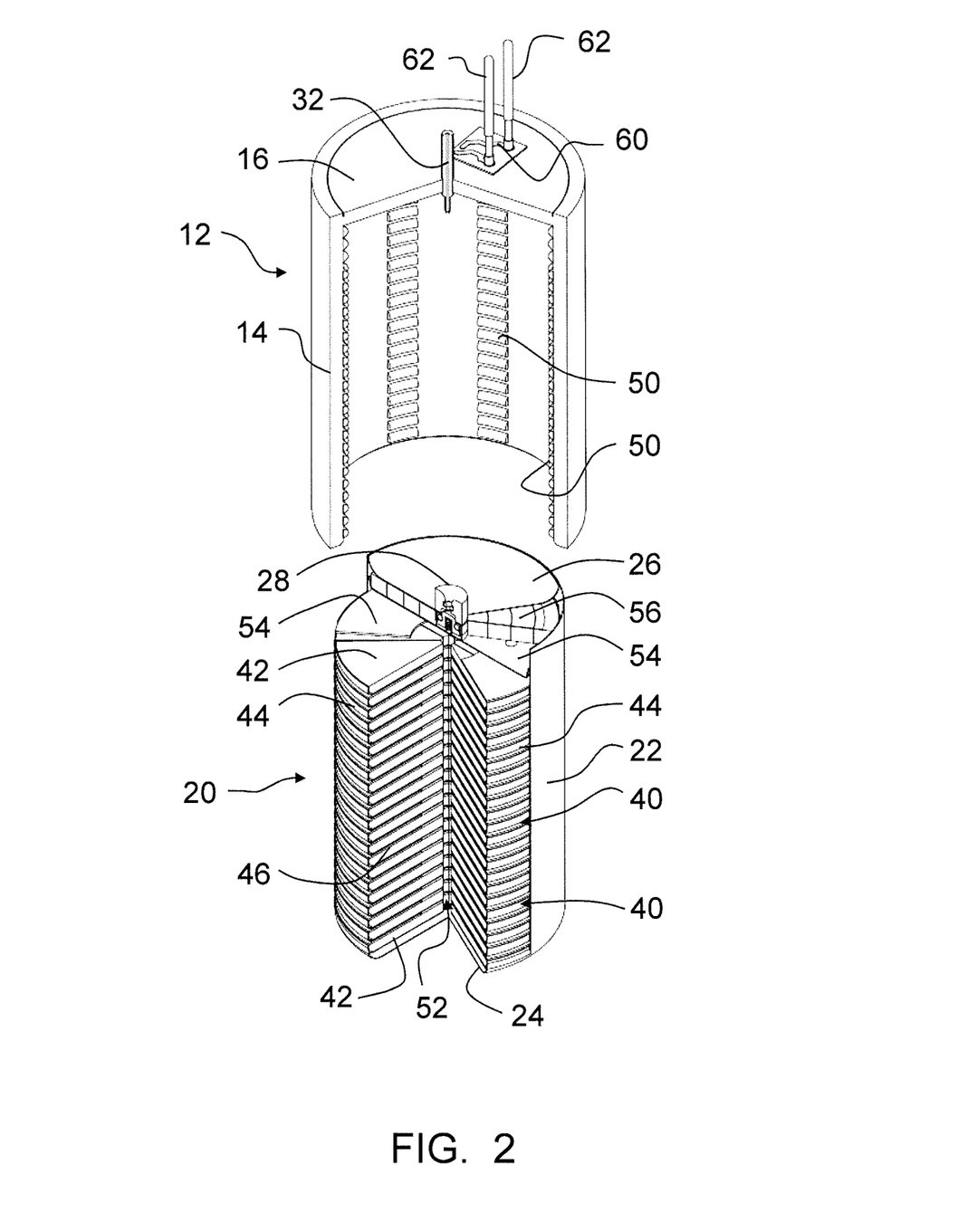
FIG. 2 is a partial sectional perspective view of the hydrogen generator in FIG. 1, with the cartridge not inserted into the chamber.
Figure 3:
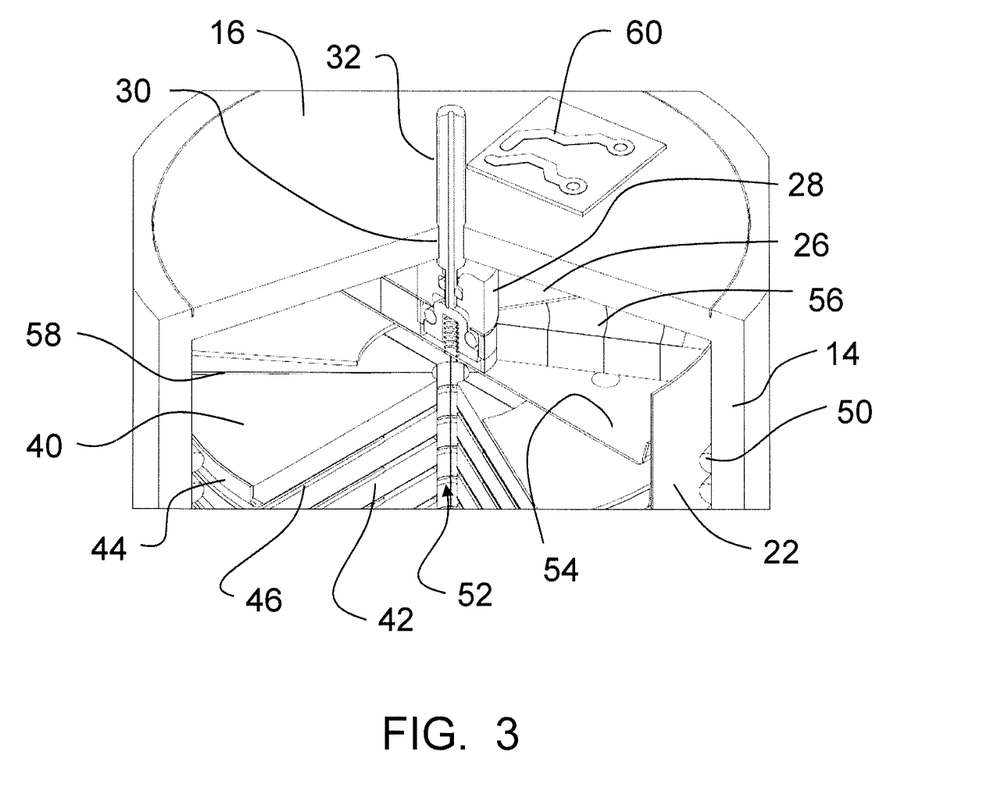
FIG. 3 is an enlarged portion of the hydrogen generator in FIG. 1

FIGS. 1, 2 and 3 illustrate an embodiment of a hydrogen generator. Hydrogen generator 10 is shown as a cylindrical device; however, its size and shape can be varied as described above. In addition, specific features shown in FIG. 1 can be deleted or modified, and other features can be added, as described above. Hydrogen generator 10 has a compartment 12 with a housing including a side wall 14, a lid 16 and a door (not shown) that define a cavity into which a cartridge 20 can be removably inserted. In FIG. 1 the cartridge 20 is inserted into the compartment 12, and in FIG. 2 the cartridge 20 is not inserted into the compartment 12. The cartridge 20 has a casing with a side wall 22, a base wall 24 and a lid 26. The base wall 24 can be a separate component that is secured to the side wall 22 (e.g., with an adhesive or by laser welding), or the base wall 24 and the side wall 22 can be portions of a unitary can. The lid 26 can be separate component that is secured to the side wall 22 (e.g., with an adhesive or by laser welding), or the lid 26 and the side wall 22 can be portions of a unitary can. The cartridge 20 includes a hydrogen outlet valve 28 secured to the lid 26 (e.g., with a glass-to-metal seal). When the cartridge 20 is installed in the compartment 12, the hydrogen outlet valve 28 can be coupled to the remainder of the system (not shown). The hydrogen outlet valve 28 can be recessed within the compartment 12 and accessed through an opening 30 in the compartment lid 16, the hydrogen outlet valve 28 can extend through the opening 30 to the outside of the hydrogen generator 10, or the hydrogen outlet valve 28 can mate with a coupling 32 in the opening 30 of the compartment lid 16, as shown in FIGS. 1, 2 and 3.

Within the cartridge 20 is a plurality of pellets 40. Each pellet 40 includes a solid composition 42 that contains a hydrogen containing material. Each pellet 40 also includes a solid heat concentrator 44 for conducting heat to the solid composition 42 without penetrating the casing. As shown in FIGS. 1, 2 and 3, the heat concentrator 44 is in the form of a shallow cup containing the solid composition 42 of the pellet 40. The peripheral wall of the cup is in direct contact with the cartridge side wall 22. The pellets 40 are arranged in layers in the cartridge 20. A layer of thermal insulation, such as an insulation disc 46 can be included to separate the layers of pellets 40 if necessary, to prevent heat from one pellet layer from unintentionally causing a reaction in an adjacent pellet layer. As shown in FIGS. 1, 2 and 3, each layer includes multiple pellets 40, with thermal insulation such as insulating layer 58 separating adjacent layers.

On the inner surface of the compartment side wall 14 is a plurality of heating elements 50. When the cartridge 20 is inserted in the compartment 12, the heating elements 50 are in direct contact with the cartridge side wall 22 and aligned on the opposite side of the cartridge side wall 22 from the peripheral walls of the heat concentrators 44.

As the pellets 40 are heated, the hydrogen gas released flows through a hydrogen flow path, which can include a central channel 52. A guide plate 54 can be used to direct the hydrogen to an entry to one or a series of filters 56 through which the hydrogen travels before reaching the hydrogen outlet valve 28. The filters 56 remove solid particles (e.g., reaction byproducts and pieces of unreacted reactant) that may be carried away from the pellets 40 by the hydrogen gas. A purification unit (not shown) can also be disposed in the cartridge before the hydrogen outlet valve 28 or elsewhere (e.g., outside the outlet valve 28) to remove contaminants such as undesired gaseous byproducts and impurities) from the hydrogen gas.

An electric circuit 60 can carry current to selected heating elements 50 to heat selected heat concentrators 44 and cause the solid composition 42 to react. The source of the electric current can be outside the hydrogen generator 10. External electrical contacts 62 can make contact with the circuit 60 to provide electric current from the source to the circuit 60.

Figures 4, 5:
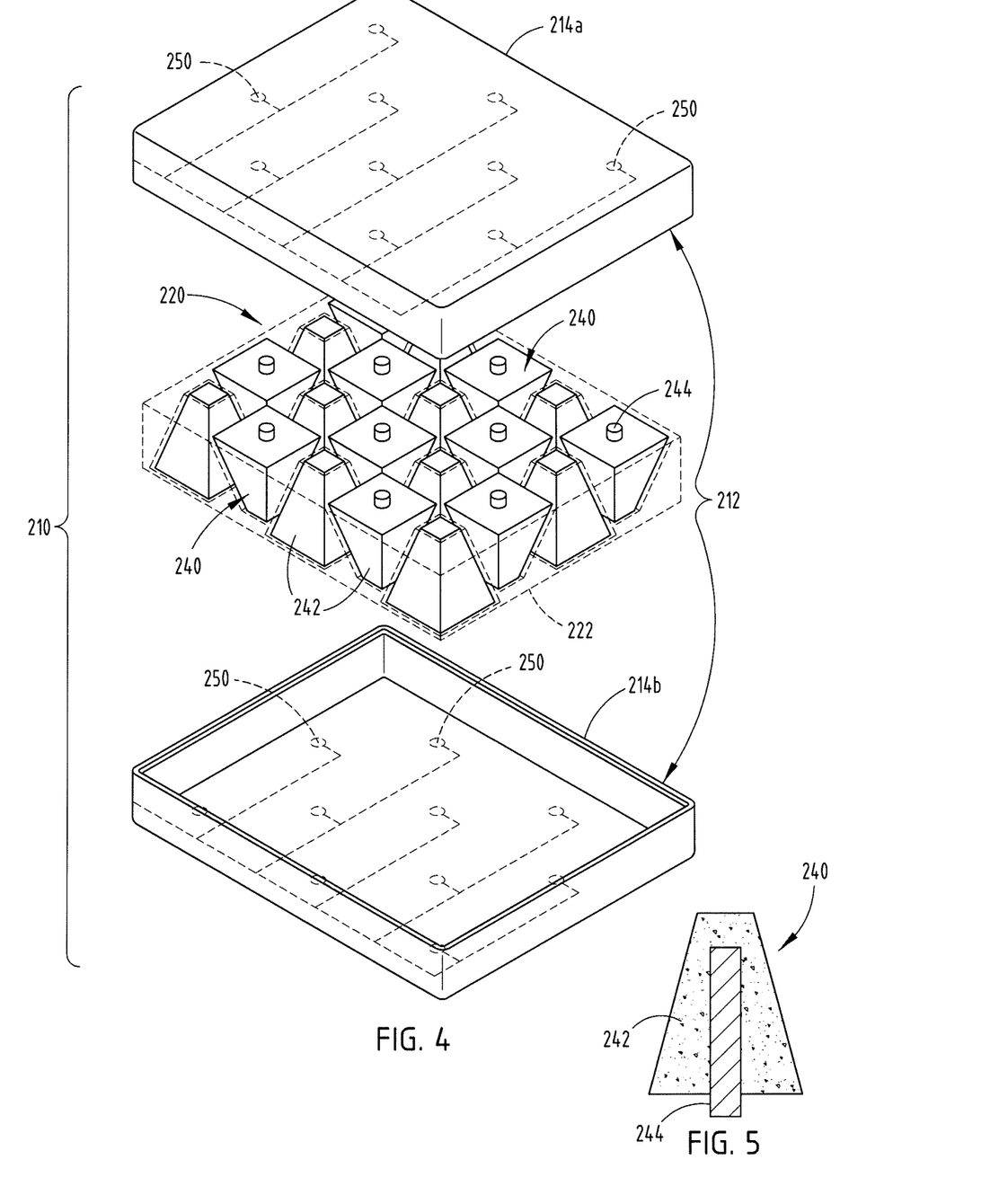
FIG. 4 is a partially exploded perspective view of a hydrogen generator according to a second embodiment.
FIG. 5 is a cross-sectional view of an individual pellet of the hydrogen generator in FIG. 1.

A second embodiment of a hydrogen generator is shown in FIG. 4. Hydrogen generator 210 has a prismatic shape and includes a compartment 212 and a cartridge 220 that can be removably inserted into the compartment 212. The compartment 212 includes a housing, which can have any suitable design, such as opposing trays 214a and 214b as shown in FIG. 4. The cartridge 220 includes a plurality of pellets 240, each including a solid composition 242 containing a hydrogen-generating material and including a heat concentrator 244 for conducting heat to the solid composition 242. The pellets 240 are contained in a casing 222 (generally represented in FIG. 4 with dashed lines) with a hydrogen outlet (not shown). The heat concentrators 244 are aligned with corresponding heating elements 250 when the cartridge 220 is installed in the compartment 212. Heat is conducted from the heating elements 250, through portions of the casing 222, and then via the heat concentrators 244 to the solid composition 242 of the pellets 240. The heat concentrators 244 make contact with but do not pass through the casing 222 and extend into the pellets 240, as shown in FIG. 5. The heat concentrators 244 are shown having a cylindrical shape but may be of other shapes. Each of the pellets 240 has a prismatic shape, such as the pyramidal shape shown in FIG. 4, with the heat concentrator 244 protruding from the large end. This arrangement can provide for uniform heat distribution to the solid composition 242 within the pellet 240 and can provide efficient heating with minimal heat loss by heating from the inside of the pellet 240. Thermal insulation can be provided between adjacent pellets 240 to prevent initiation of the hydrogen-generating reaction in one pellet 240 by an adjacent pellet 240 and allow heating of only selected pellets 240. Adjacent pellets 240 can oriented in opposite directions as shown to provide efficient utilization of the volume of the cartridge 220.

Figure 6:
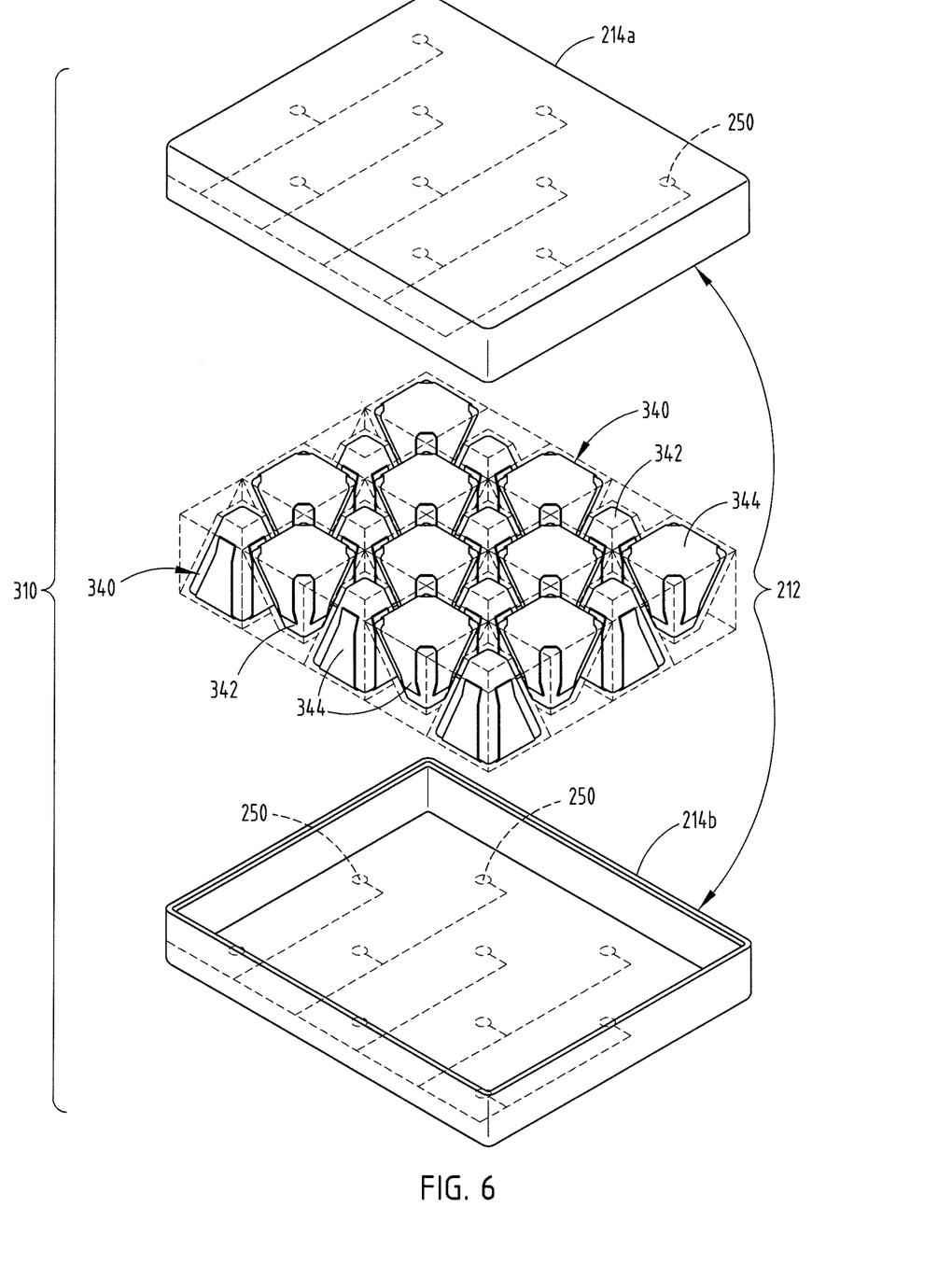
FIG. 6 is a partially exploded perspective view of a hydrogen generator according to a third embodiment.
Figure 7:
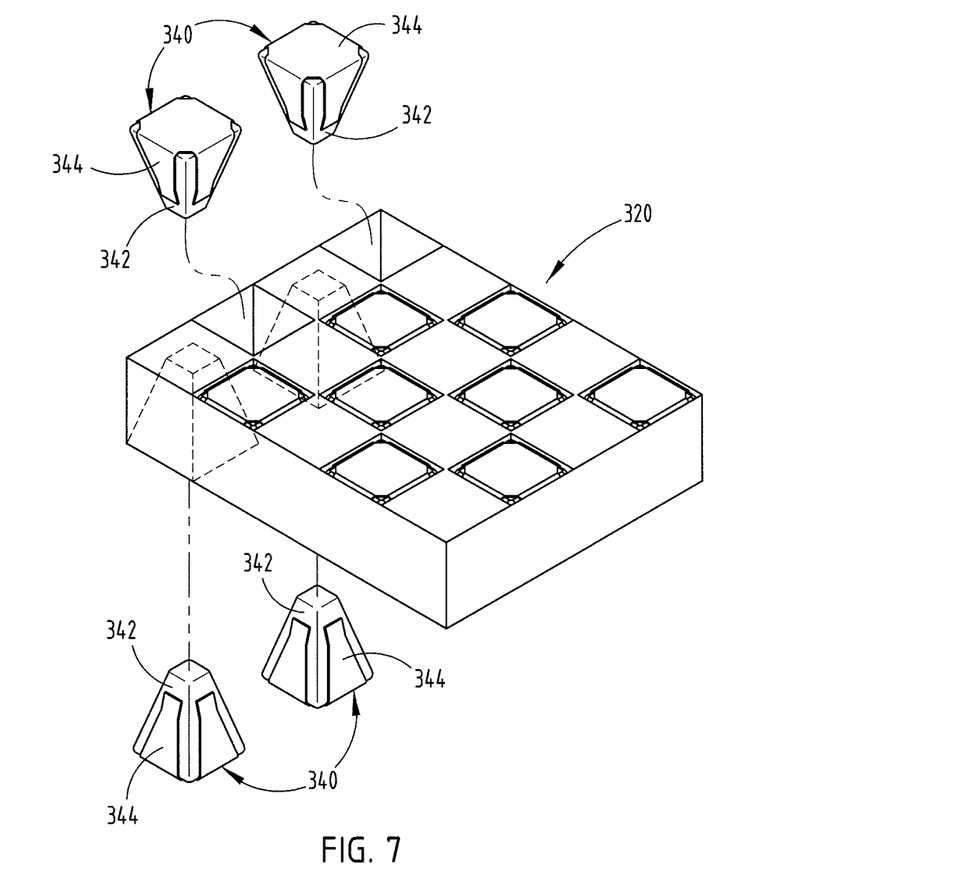
FIG. 7 is a partially exploded perspective view of a cartridge for use in the hydrogen generator in FIG. 6.
Figure 8:
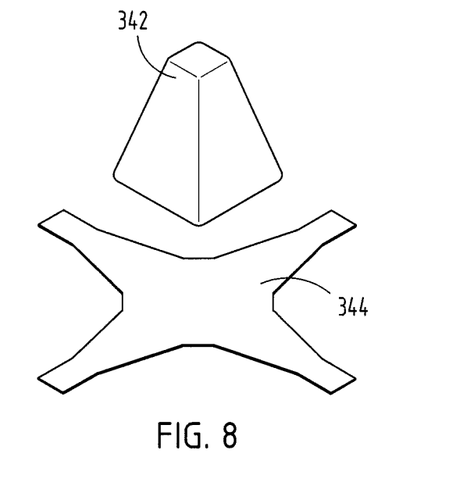
FIG. 8 is a perspective view of a pellet and a heat transfer member, before assembly.
Figure 9:
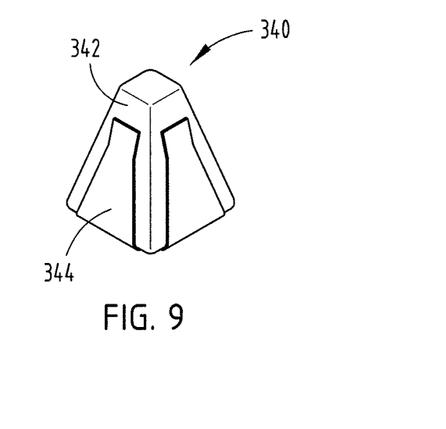
FIG. 9 is a perspective view of the pellet and heat transfer member in FIG. 8, after assembly.

A third embodiment of a hydrogen generator is shown in FIG. 6. Hydrogen generator 310 is similar to hydrogen generator 210 in FIG. 4, but in FIG. 6 the pellets 340 have heat concentrators 344 on external surfaces of the pellets 340. An embodiment of the cartridge 320 is shown in FIG. 7, and a pellet 340 is shown before and after assembly of the heat concentrator 344 and solid composition 342 in FIGS. 8 and 9, respectively. As shown in FIGS. 6 to 9, the heat concentrators 344 are only on external surfaces of the pellets 340; however, the heat concentrators can also be shaped to extend into the solid composition 342 (e.g., with inward projecting barbs).

Figure 10:
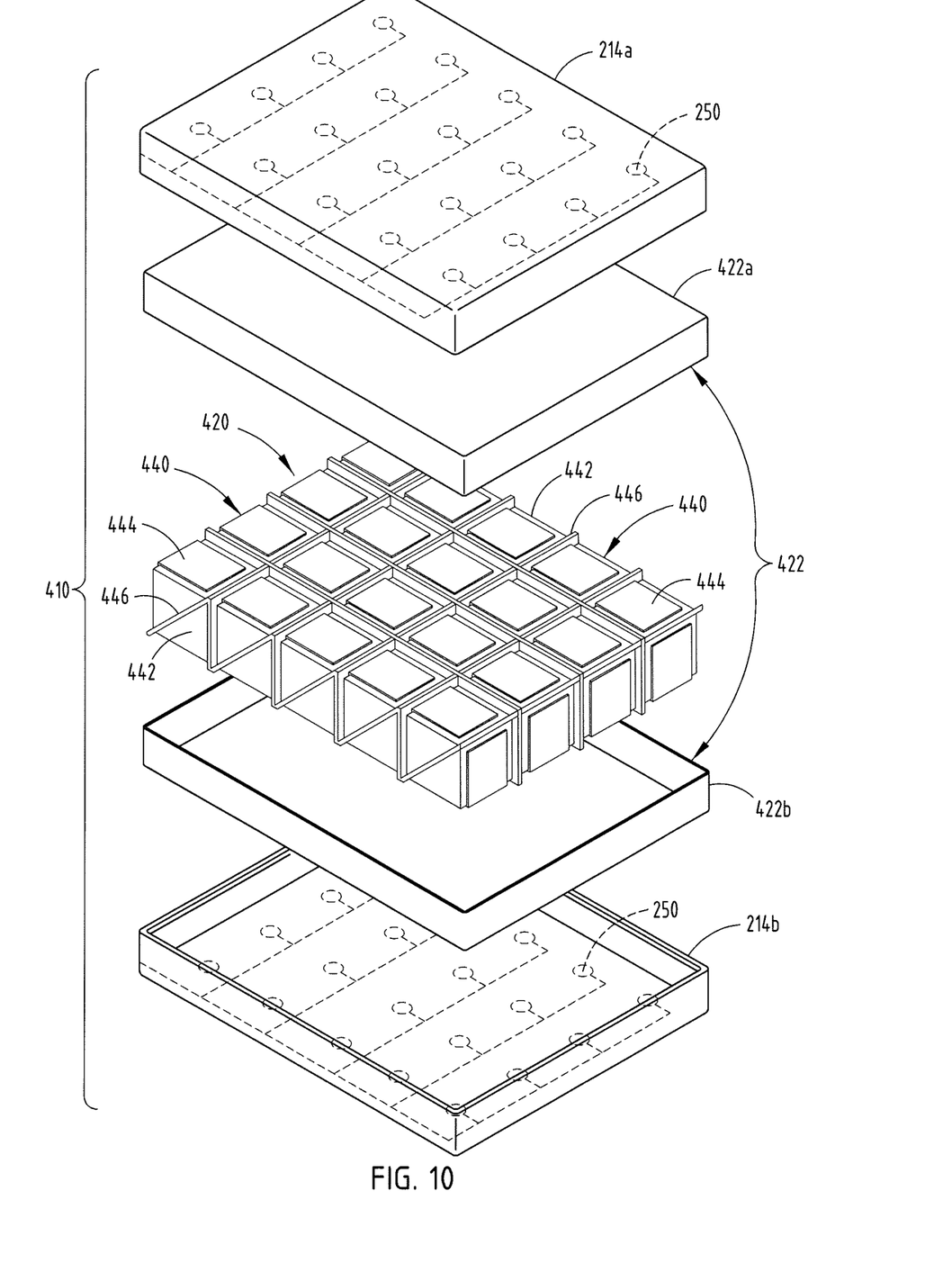
FIG. 10 is a partially exploded perspective view of a hydrogen generator according to a fourth embodiment.
Figure 11:
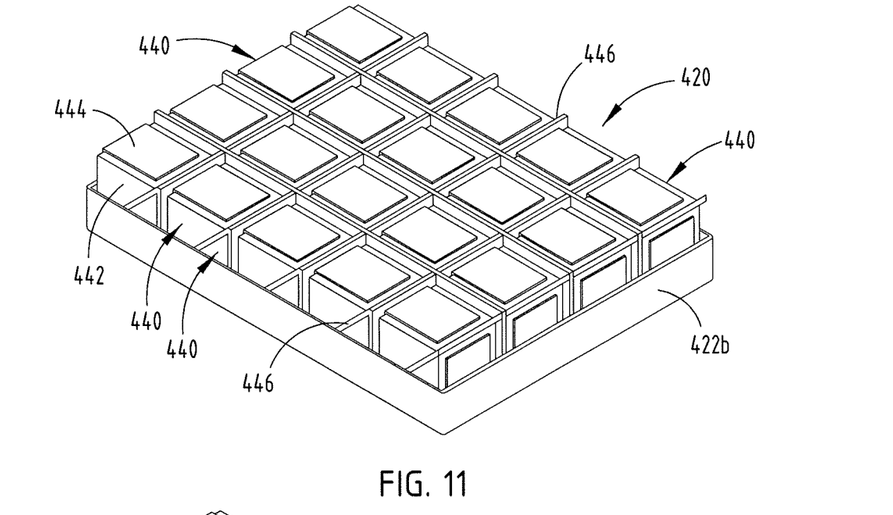
FIG. 11 is a perspective view of a portion of a cartridge of the hydrogen generator in FIG. 10.
Figure 12:
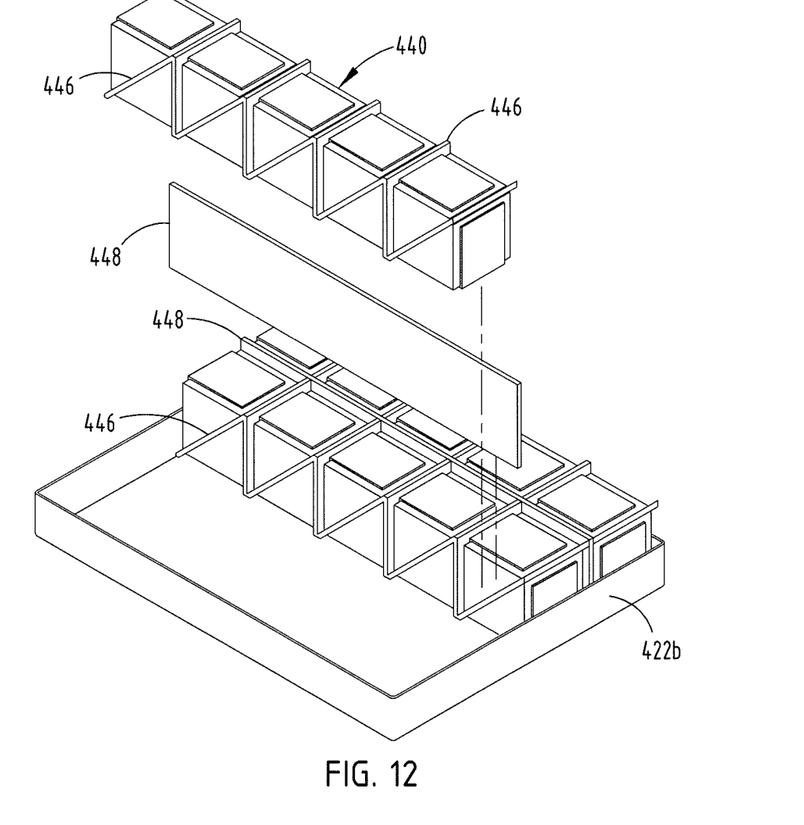
FIG. 12 is a partially exploded perspective view of a portion of the cartridge of the hydrogen generator in FIG. 10.
Figures 13, 14, 15:
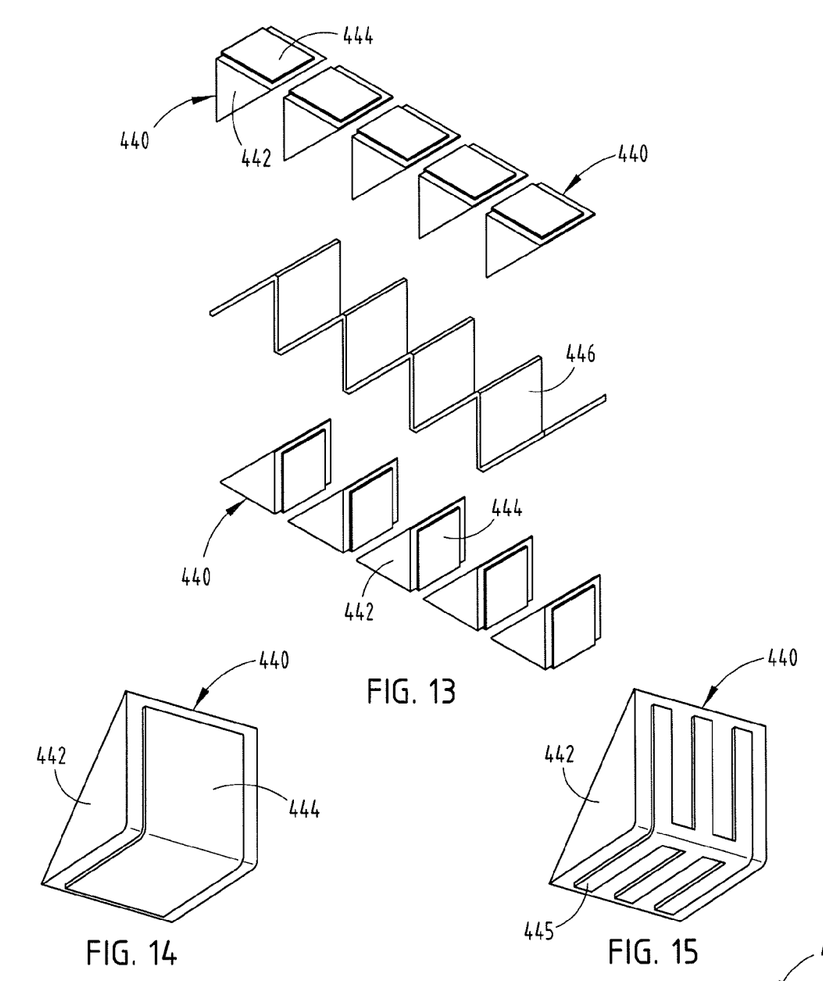
FIG. 13 is an exploded view of a portion of the cartridge of the hydrogen generator in FIG. 10.
FIG. 14 is a perspective view of an individual pellet and heat transfer member of the hydrogen generator in FIG. 10.
FIG. 15 is a perspective view of an alternative embodiment of an individual pellet and heat transfer member of the hydrogen generator in FIG. 10.
Figure 16:
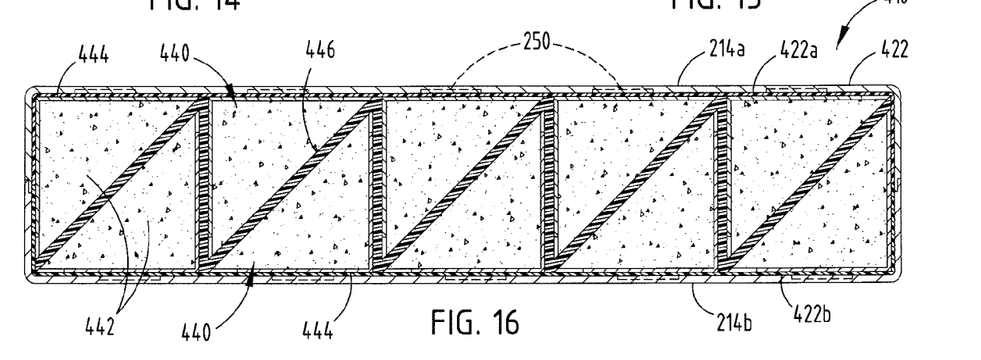
FIG. 16 is a cross-sectional plan view of the hydrogen generator in FIG. 10.

A fourth embodiment of a hydrogen generator is shown in FIG. 10. Hydrogen generator 410 is similar to hydrogen generators 210 and 310, with prismatic pellets 440 each including a solid composition 442 containing the hydrogen-generating material and a heat concentrator 444 for conducting heat to the solid composition 442. The pellets 440 in this embodiment have a triangular cross section. A cartridge casing 422, which can have two opposing halves 422a and 422b, is shown in FIG. 10. The casing 422 can be made from a material that is a poor thermal conductor with thermally conductive areas (not shown) corresponding to the heating elements 250 when the cartridge 420 is contained within the compartment 212, so pellets 440 can be selectively heated by the corresponding heating elements 250. FIG. 11 shows the pellets 440 lower housing half 422b from FIG. 10, and FIG. 12 is a partially exploded view of the assembly in FIG. 11, showing three of the four rows of pellets in FIG. 11. Thermal insulation 446 is disposed in each row of pellets 440, between the adjacent pellets 440, and thermal insulation is also disposed between adjacent rows of pellets 440. The pellets 440 and thermal insulation 446 of one row of pellets 440 are shown in the exploded view of FIG. 13, and a single pellet 440 is shown in FIG. 14. Another embodiment of a pellet 445 that can be used in the hydrogen generator 410 is shown in FIG. 15, where the heat concentrator 445 has been modified to include a plurality of connected fingers. FIG. 16 is a non-exploded, cross-sectional view of the hydrogen generator 410 in FIG. 10. The heat concentrators 444 are disposed against the top and bottom casing halves 422a, 422b, which are disposed against the heating elements 250 to provide good heat transfer from the heating elements 250, through the casing halves 422a, 422b and corresponding heat concentrators 444 to the solid composition 442 of the pellets 440.

Figure 17:
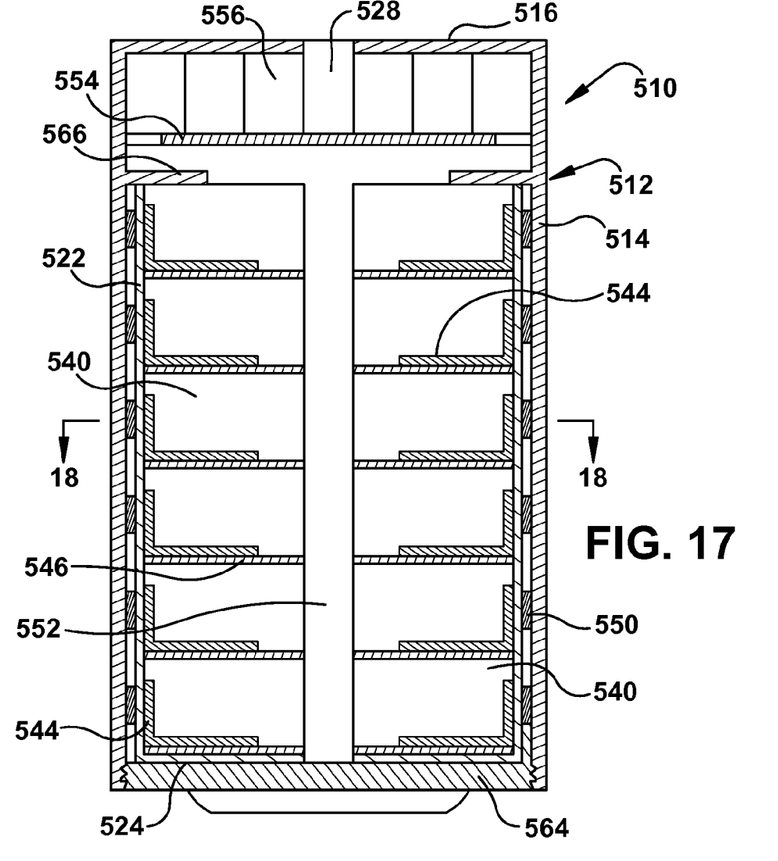
FIG. 17 is a cross-sectional plan view of an embodiment of a hydrogen generator.
Figure 18:
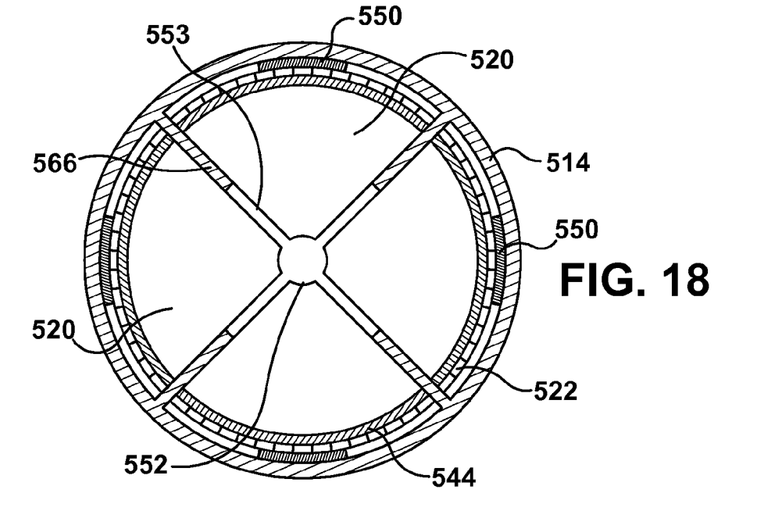
FIG. 18 is a cross-sectional view of the hydrogen generator in FIG. 17, taken though 18-18.

Another embodiment of a hydrogen generator is shown in FIGS. 17 and 18. in this embodiment, hydrogen generator 510 is configured to accommodate a plurality of cartridges 520. The hydrogen generator 510 has a compartment 512 with a side wall 514 and a lid 16 that can be opened to insert cartridges 520 and remove the cartridges 520 after they have been used. Heating elements 550 are disposed on the inside surface of the housing side wall 514 such that the individual pellets 540 will be aligned with the heating elements 550 when the cartridges 520 are disposed in the hydrogen generator 510. Alignment features 566 can extend from the inner surface of the housing side wall 514 to facilitate proper of alignment of the pellets 540 with the heating elements 550. The alignment features 566 can also separate the cartridges 520, creating channels 553 between the cartridges 520. Each cartridge 520 includes a stack of individual pellets 540 within a casing, which can have a side wall 522 and a base wall 524. The casing includes sections that are good conductors of heat from the heating elements 550 to the pellets 540. The solid composition of the pellet 540 contains a hydrogen containing material. The hydrogen containing material can be in direct contact with the casing side wall 522 and/or a heat concentrator 544 disposed on the surface of and/or within the pellet 544. When a pellet 540 is heated by a heating element 550, hydrogen gas is released and travels through a hydrogen flow path to a hydrogen outlet 528. The hydrogen flow path can include one or more channels, such as central channel 552 and channels 553 between the cartridges 520. A filter 556, which can include one or multiple filter elements, can be disposed within the hydrogen flow path to remove solid contaminants from the hydrogen gas. A plate 554 can be present in the housing 512 to support the filter 556 and guide the hydrogen so it will flow through the filter 556 before reaching the hydrogen outlet 528. Thermal insulation can be disposed between adjacent pellets 540 to prevent heat from one pellet 540 from causing hydrogen containing material in an adjacent pellet 540 from releasing hydrogen gas. The thermal insulation can be disposed between pellets in a stack, such as insulating discs 546, thermal insulation can be coated on surfaces of the pellets 540, and thermal insulation can be disposed in channels such as channels 552 and 553 around the pellets 540 and fuel units 520. The thermal insulation can be porous material that will allow hydrogen gas to flow therethrough. In a variation of the embodiment in FIGS. 17 and 18, the cartridge casing can completely enclose the pellets 540 therein, with one or more passages in the casing through which hydrogen can pass or with at least a portion of the casing being hydrogen permeable. Although hydrogen generator 510 is shown with multiple cartridges 520 in a single cavity within the compartment 512, compartment 512 can be divided into multiple cavities, such as by extending alignment features 566 inward. The compartment housing door 564 can also be modified to provide separate access to individual or groups of cartridges 520.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

What is claimed is:

1. A hydrogen generator comprising:
   a cartridge, the cartridge comprising:
     a casing;
     a plurality of pellets, each comprising at least one hydrogen containing material capable of releasing hydrogen gas when heated; a plurality of solid heat transfer members, each in direct contact with but not penetrating the casing; a hydrogen outlet valve in the casing; and
     a hydrogen flow path from each fuel pellet to the hydrogen outlet valve;
   a compartment configured to removably contain the cartridge, the compartment comprising:
     a housing comprising a wall;
     a hydrogen outlet through the housing;
     a cavity within the housing within which the cartridge can be disposed; and
     a plurality of heating elements disposed within the housing such that when the cartridge is disposed within the cavity each heating element is in contact with an outer surface of the cartridge casing and disposed so that heat can be conducted from the heating element, through the casing and to a heat transfer member, which can conduct the heat to a portion of the at least one hydrogen containing material not in contact with the casing; and
   an initiation system comprising the heat transfer members, the heating elements, and circuitry for conducting an electric current to the heating elements, wherein the electrical current can be applied selectively to one or more heating elements for generating heat to selectively heat one or more pellets to initiate a release of hydrogen gas.

2. The hydrogen generator according to claim 1, wherein the cartridge and the compartment cooperate so the cartridge can be inserted into the compartment only such that the heating elements and the heat transfer members are aligned for conducting heat from the heating elements, through the casing, to corresponding heat transfer members.

3. The hydrogen generator according to claim 1, wherein at least a portion of each heat transfer member is disposed on a pellet surface.

4. The hydrogen generator according to claim 3, wherein the heat transfer members are partially disposed within the pellets.

5. The hydrogen generator according to claim 1, wherein each heat transfer member has a cartridge casing contact portion.

6. The hydrogen generator according to claim 1, wherein each heat transfer member includes a layer of pyrolytic carbon in contact with a pellet.

7. The hydrogen generator according to claim 1, wherein the heat transfer members are in pressure contact with an inside surface of the casing.

8. The hydrogen generator according to claim 1, wherein the pellets are disposed in one or more layers and a thermally insulating material is disposed between adjacent pellets in a layer of pellets.

9. The hydrogen generator according to claim 8, wherein a layer of the thermally insulating material separates adjacent layers of pellets.

10. The hydrogen generator according to claim 9, wherein pellet surfaces are coated with a layer of the thermally insulating material.

11. The hydrogen generator according to claim 1, wherein the cartridge comprises means for maintaining contact between the heat transfer members and the pellets as the hydrogen generator is being used.

12. The hydrogen generator according to claim 1, wherein the cartridge is enclosed in the casing prior to the cartridge being disposed in the cavity.

13. The hydrogen generator according to claim 1, wherein the pellets further comprise at least one ignition material selected from the group consisting of metal/metal oxide multilayers, a metal/metal multilayered thin film, an autoignition composition, a gel of a metal and water, and a gel of metal and water in combination with sodium borohydride.

14. The hydrogen generator according to claim 1, wherein the plurality of pellets is disposed in a plurality of layers.

15. The hydrogen generator according to claim 14, wherein each layer comprises a plurality of pellets.

16. The hydrogen generator according to claim 14, wherein the plurality of pellets is disposed in a single layer.

17. The hydrogen generator according to claim 1, wherein the plurality of pellets does not include a catalyst for the release of hydrogen gas.

18. A fuel cell system comprising: a fuel cell battery; and the hydrogen generator according to claim 1.

19. The fuel cell system according to claim 18, wherein a portion of the initiation system is outside the hydrogen generator.

20. The fuel cell system according to claim 18, wherein the initiation system is configured to monitor at least one of temperature and pressure and to selectively heat one or more pellets to provide hydrogen gas as needed by the fuel cell battery.

21. The hydrogen generator according to claim 1, wherein
the casing comprises two opposing halves; and
the casing comprises a material that is a poor thermal conductor with thermally conductive areas corresponding to the heating elements when the cartridge is contained within the compartment.

22. The hydrogen generator according to claim 21, wherein the casing comprises a sealed casing capable of remaining sealed during use.

\* \* \* \* \*